United States Patent [19]

Kayser et al.

[11] Patent Number: 4,786,525

[45] Date of Patent: Nov. 22, 1988

[54] PIPE LININGS

[75] Inventors: Charles R. W. Kayser, Nelson; Kathleen Trippier, Rossendale, both of United Kingdom

[73] Assignee: Humes Limited, Australia

[21] Appl. No.: 494,749

[22] Filed: May 16, 1983

[30] Foreign Application Priority Data

May 14, 1982 [GB] United Kingdom ............... 82 14093

[51] Int. Cl.⁴ .............................................. B05D 7/22
[52] U.S. Cl. .................................... 427/236; 427/239; 427/299; 427/327; 427/422; 427/426; 427/388.1
[58] Field of Search ............... 427/236, 239, 422, 426, 427/299, 327, 388.1

[56] References Cited

U.S. PATENT DOCUMENTS

| 3,603,096 | 9/1971 | Wells | 427/236 |
|---|---|---|---|
| 4,064,293 | 12/1977 | Nicklas | 427/236 |
| 4,178,875 | 12/1979 | Moschetti | 427/236 |
| 4,251,573 | 2/1981 | Holm et al. | 427/236 |
| 4,308,824 | 1/1982 | Muta et al. | 118/713 |
| 4,327,132 | 4/1982 | Shinno | 427/236 |
| 4,370,364 | 1/1983 | Boer | 427/239 |
| 4,401,696 | 8/1983 | Wood | 427/236 |
| 4,440,350 | 4/1984 | Dietz et al. | 118/317 |

Primary Examiner—Janyce A. Bell
Attorney, Agent, or Firm—W. Thad Adams, III

[57] ABSTRACT

A spraying device is drawn through an underground pipe and sprays a thixotropic resin onto the inner walls of the pipe. The resin cures and hardens, to form an internal lining to the pipe. The resin has sufficient thixotropy to enable it to be applied in a single operation to a significant thickness, preferably in the range 2 to 25 mm. The lining which is formed upon curing therefore has significant structural strength. To allow such a resin to be pumped from the surface down to the spraying device, along a significant length of tubing, the resin is firstly heated, prior to being pumped.

Also disclosed is a swab for swabbing a pipe immediately prior to the application of a lining therein.

16 Claims, 2 Drawing Sheets

PIPE LININGS

This invention relates to the lining of pipes, and is particularly although not exclusively concerned with the lining of underground pipes.

Pipes are laid underground for very many purposes, such as for sewage, drainage, and the flow of various fluids, including water, some of which can be corrosive to a greater or lesser degree. With the passage of time, such underground pipes may become damaged, either due to structural defects or due to corrosion, for example, and then the pipes either have to be replaced or relined. Where a man can enter an underground pipe, the problem of relining is not so critical, and numerous systems can be put into effect. However, very many underground pipes are of such a size that a man cannot enter them, and in order to repair such pipes, a considerable amount of time and labour is normally involved.

It is known to provide systems for applying a lining to an underground pipe in a remote manner. This has been done by causing a spraying device to travel through the pipe, whilst spray applying a layer of resin to the inner walls of the pipe. However, such systems are limited only to providing linings which can give protection from corrosion, etc., by effectively covering the interior of the pipes. Such layers of resin can provide no structural reinforcement. By the very nature of the resins used, the layers may be at the most 1 mm thick. In order to build up a lining of any significant thickness, a large number of successive sprayings would be required, which would be extremely time consuming and expensive, and still would not necessarily provide the requisite degree of mechanical strength, or allow return to service in a reasonable time.

The present invention aims to provide a method of forming a pipe lining which may be improved in the foregoing respect.

According to a first aspect of the present invention, there is provided a method of applying a structural lining to a pipe, comprising the steps of moving a spraying means through the pipe, pumping a thixotropic resin to the spraying means, causing the spraying means to spray continuously the thixotropic resin onto the inner walls of the pipe to build up a predetermined thickness of the resin in one pass of the spraying means, and allowing the resin to cure and harden, said predetermined thickness being such as to provide upon curing of the resin a lining having significant structural strength.

Said thickness may be in the range 1 mm to 25 mm, and advantageously in the range 2 mm to 15 mm. The said thickness may preferably be in the range 8 mm to 12 mm.

The method preferably includes the preliminary step of warming the thixotropic resin prior to pumping it to the spraying means. The thixotropic resin may be warmed to a temperature in the range 15° C. to 40° C., and preferably in the range 25° C. to 35° C., prior to pumping.

The method is particularly applicable wherein said pipe is underground. In such a case, the thixotropic resin may advantageously be pumped to the spraying means by a pump disposed above ground.

The spraying means preferably comprises a spinning member, the diameter and speed of rotation of which are such as to spray the resin in fine droplets, without causing foaming of the resin on the spinning member or air entrapment on the pipe wall. The spinning member may comprise a perforated cylinder, or it may comprise a cup.

Said resin is preferably an epoxy resin. With advantage, the resin may be a two component resin, the components of which are mixed at or adjacent the spraying means.

The method may include a preliminary step of swabbing the pipe to soak up any fluid lying therein. The pipe may be swabbed by means of a swab entrained to move through the pipe up stream of the spraying means.

According to a second aspect of the present invention, there is provided apparatus for applying a lining to a pipe, comprising spraying means for spraying a lining material onto the inner walls of a pipe; drive means for moving the spraying means through the pipe; and swab means adapted to be moved through the pipe with and upstream of the spraying means, to soak up any fluid lying in the pipe.

Preferably, the swab is composed of a plurality of successive sections. At least part of the swab may have a surface formed with projections, which may be in the form of annular ribs. The annular ribs may with advantage be chamfered.

The cross-section of the swab may comprise a sector of a circle, which sector is preferably a minor sector (i.e. subtending an angle of less than 180°).

For a better understanding of the invention and to show how the same may be carried into effect, reference will now be made, by way of example, to the accompanying diagrammatic drawings, in which.

Figure 1:
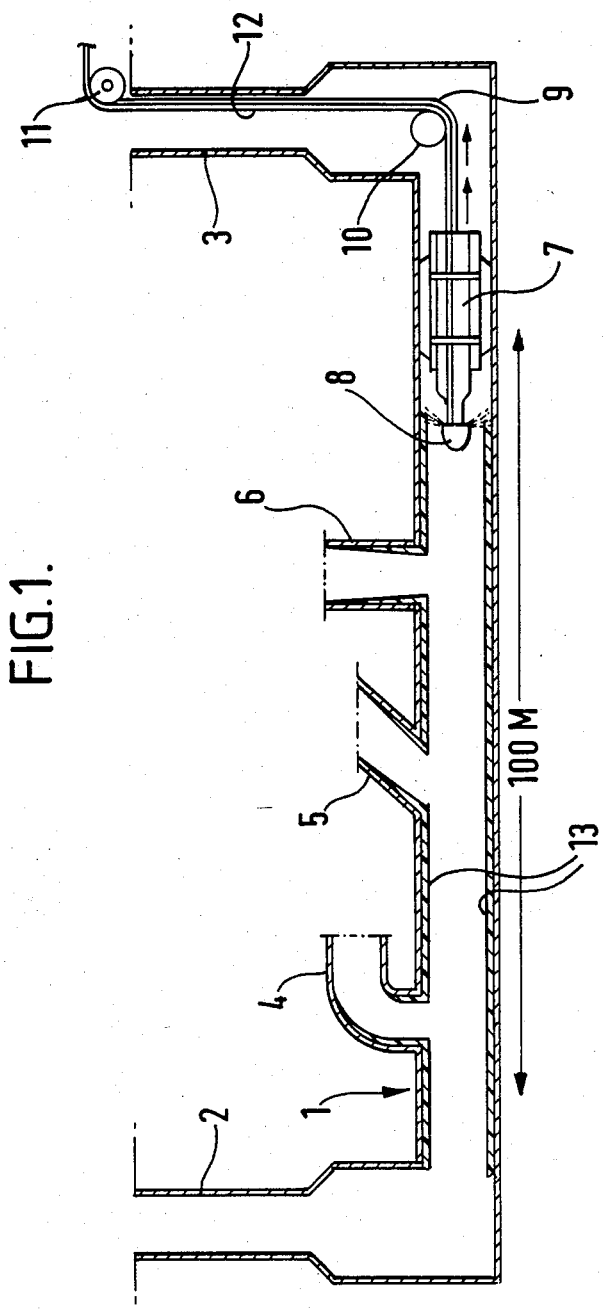
FIG. 1 illustrates, in section, a section of underground piping, and means for applying a lining thereto, in accordance with the invention.

In FIG. 1, the length of underground piping 1 extends between two manholes 2 and 3, for a distance of approximately 100 meters. By way of example, the pipe 1 is shown as having a variety of junctions thereto, including a 90° bend 4, and inclined junction 5, and a Tee junction 6.

A spraying device 7 is shown within the pipe 1, and comprises a spinning cup 8 which is arranged to be driven in rotation by an air motor. A cable 9 is connected to the spraying device 7, and passes around pulleys 10 and 11 to ground level. Tubing 12 extends from the spraying device 7 to above ground. (In practice, two tubes 12 are provided, although only one is shown in the drawing, for clarity).

The pipe 1 has become damaged, either due to structural defects or due to corrosion (or both), and being of such a size that a man cannot gain entry thereto, would normally require replacement. However, to avoid this expensive and time consuming exercise, the pipe 1 is provided with a lining 13, along its inside walls, as follows.

Firstly, the pipe 1 may, if it is considered necessary, be subjected to a preliminary cleaning operation, by suitable known means. Then, the spraying device 7 is introduced into the pipe 1, at the left hand end (as seen) thereof. The cable 9 extends along the full length of the pipe 1, around the pulleys 10 and 11, and to a winch (not shown).

A two component thixotropic epoxy resin is heated at the surface, to about 20° C., and is then fed down the tubes 12, which are of approximately ¾-1 inch inside diameter, to the spraying device 7. The spinning cup 8 is caused to rotate, and the warmed resin is applied thereto. The spinning cup 8 causes the resin to be propelled radially outwards in fine droplets, which adhere to the inner walls of the pipe 1, to build up the lining 13. As the resin is being so applied, the winch is operated to pull the spraying device slowly along the pipe 1, such that the lining 13 is progressively applied to the desired thickness, along the full length thereof.

The importance of using a thixotropic resin is that it can be applied in a single operation up to a sufficient thickness as to provide structural reinforcement. Also, the inherent properties of a thixotropic epoxy resin make it suitable for use as a structural lining. By way of example, a lining may be applied in a single coating, to a thickness in the range 1 mm to 25 mm and preferably in the range 2 mm to 15 mm. In the illustrated example, the lining 13 may have a thickness of approximately 10 mm.

The spray device 7 is provided with a dynamic or static mixer, which mixes together thoroughly the two components of the resin, which have been pumped down the tubes 12. The dynamic mixer comprises rotating paddles, and the static mixer includes static baffles to mix the two components together thoroughly. It is particularly advantageous to provide the static mixer at the spray device 7 itself, as this gives more flexibility of the system in use. It will be appreciated that, as soon as the two components of the resin are mixed together, therewill be a limited time (commonly referred to as the "pot life") during which the resin may be used. This is shortened by the preheating and bulk mixing of the two components. As the pot life of the resin may only be within the range 5 minutes to 30 minutes, by way of example, it will be appreciated that this can be a critical factor. The problems caused by short pot life are overcome by mixing the two components within the pipe prior to spraying.

Instead, of using a dynamic mixer at the spraying device 7, it is possible to use a static mixer, whereby the components are simply caused to flow around static vanes, thereby to cause vortex mixing of the two components. This may particularly be useful where the spray device 7 is adapted to operate in very small pipes.

As mentioned above, the two components of the resin are heated to about 20° C. (or to a temperature in the range 15° C. to 35° C.), before being passed down the tubes 12. The purpose of heating the resin is to facilitate the flow of resin through the tubes 12, and also to enhance the spray characteristics of the resin as it is applied by the spinning cup 8. In this connection, it will be appreciated that the resin must have sufficient thixotropy to enable it to be applied to a significant thickness in one pass of the spraying device 7.

The components of the resin are fed down the tubes 12 under pressure. It will be appreciated that the pumping of such thixotropic materials through an appreciable length of tubing (more than 100 in meters in this example) poses considerable problems, particularly where the diameter of the pipe 1 upon which work is being carried out is so small as to prevent the use of relatively large diameter tubing. To assist meeting this problem, there is used tubing 12 of approximately ¾-1 inch internal diameter, which is substantially greater than the diameter of tubing used in the application of non-thixotropic resins. Moreover, the components are fed down the tubes 12 at a relatively high pressure, of approximately 2,000 p.s.i. (and preferably at least 1,000 p.s.i.). The combination of relatively large tube diameter, relatively high pressure, and initial heating of ther resin components greatly facilitates the desired flow rate of materials down the tubes 12.

It will be appreciated that the speed of the cable 9, operated by the winch, must be sufficiently slow as to permit sufficient thickness of resin to build up within the pipe 1. However, it must not be too slow as to lead to the likelihood of jerks in the cable 9, and a minimum travel rate of approximately half metre a minute is required. The delivery rate of the resin to the spinning cup 8 must then be sufficiently great as to provide the desired thickness of the lining 13.

The shape and diameter of the spinning cup 8, as well as the speed pf rotation thereof, must be selected with care. It will be appreciated that the spinning cup 8 must rotate sufficiently quickly as to cause the resin to move radially outwardly, to the edge of the cup 8. When the resin reaches the periphery of the cup 8, it must be travelling at a sufficiently high peripheral speed to ensure that the resin is dispersed in fine drpolets, in the form of a spray which than adheres to the pipe 1.

In our experience, we were surprised to find that, under certain conditions, the thixotropic resin did not form a sufficiently strong structural lining, despite being of a desired thickness. Upon subsequent investigation, we found that this situation occurred where the thixotropic resoin was caused to foam in the spinning cup 8. Foaming was often very difficult to detect, as the cell size of the foam could often be extremely small. Nevertheless, foaming was found to affect the physical properties of the layer so formed in a very serious manner, leading to very low structural strength of the lining, brittleness of the lining, dramatically increased curing time of the resin, lower adhesion of the resin to the respective pipe, and a tendency of the resin to sag.

Upon further research, we discovered that foaming of the resin in the spinning cup 8 occured when the cup 8 was caused to rotate too high an angular speed. Therefore, in order to achieve a satisfactorily result, it is important to ensure that the angular speed of the spinning cup 8 is not sufficiently high as to cause foaming, whilst at the same time ensuring that the diameter of the cup is sufficiently large to ensure a sufficiently high peripheral speed, in order to provide, but there is a sufficient distance between the periphery of the cup and the pipe wall to allow the resin spray to lose some of its momentum and reduce the impact with which it hits the pipe wall, the required dispersion of fine droplets of the resin spray and to afford a smoother finish to the lining 13. The actual choice of the speed of rotation of the cup 8 and its diameter will of course depend upon particular circumstances, including the shape of the cup 8, and the diameter of the pipe which it is required to line. Other factors include the flow characteristics and flow rate of the resins. The important thing to ensure is that foaming does not occur. Improving the flow characteristics of the resin, by warming the resin, for example, enables the angular speed of the cup to be increased.

Although it is preferred to provide mixing of the resin components actually at or adjacent the spinning cup 8, it may alternatively be possible to mix the components at ground level, although the pot life of the resin will then be somewhat more of a problem. However, to minimize this problem, it is preferred to heat the resin components as before, and to mix and meter the components immediately upstream of the pump, by which the resin is forced into the then single tube 12. In this way, it is not necessary to mix a large quantity of the components in a reservoir. This is important as a larger quantity of resin tends to cure very much more quickly than a smaller quantity.

The illustrated method and apparatus may thus be used to form a structural lining in a pipe, in situ, in a simple and reliable manner. As illustrated in the drawing, we have found that the lining 13 is applied very successfully also at the junctions of the subsidiary pipes 4, 5 and 6. The use of thixotropic epoxy resin enables the lining 13 to be built up in a single application, and the above described method and apparatus enables that layer to be so applied, despite the fact that thixotropic materials appear to be inherently unsuitable for spray application, particularly by remote means at the end of a considerable length of tubing.

We have found that the illustrated method and apparatus may be employed in pipes of a diameter as little as 4 inches, and may be extended to larger diameter pipes as desired. The lining such as 13 in effect becomes a self contained pipe within the original pipe 1, with its own independent structural strength. By way of example, the wall thickness of the lining 13 may be in the range 3 to 5% of the internal diameter of the pipe 1. This means that the original pipe 1 may even decay away altogether, with no further ill effect. As we have found the method and apparatus to be effective over lengths of 100 meters, this means that a pipe lining may readily be applied between existing manholes. The lining 13 can be applied even in damp conditions, and extensive cleaning and preparation of the pipe 1, prior to spraying, is not essential.

As an alterntive to the spinning cup 8, there may be employed a perforated spinning cylinder. The cylinder may be perforated by a plurality of small holes, or by a plurality of slots.

When heating the resin prior to pumping it to the spinning cup 8, care must be taken not to overheat it. The resin undergoes an exothermic reaction during curing, and if it is pre-heated too greatly, the extra heat of the exothermic reaction may cause bubbling and self-destruction of the lining. Factors affecting this include the thermal conductivity and internal diameter of the pipe 1, and the desired thickness of the lining 13. For a small diameter pipe 1 of plastics material (i.e. of low thermal conductivity), the resin will generally require less pre-heating than for a larger diameter clay pipe.

Although the apparatus of FIG. 1 may be used readily in many situations without the need for extensive preparation of the pipe 1, there may nevertheless be situations where preparation is required. In such a case, the modified apparatus of FIG. 2 may be useful.

Figure 2:
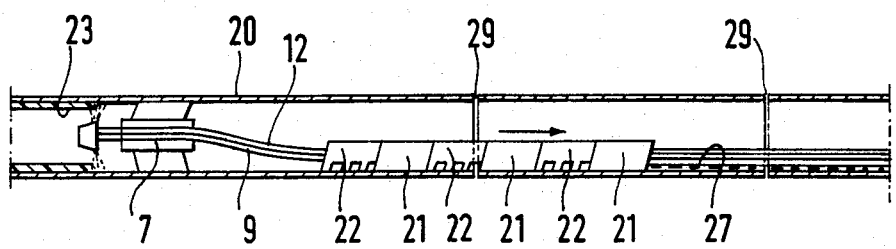
FIG. 2 illustrates, in section, a length of piping and modified means for applying a lining thereto.

In FIG. 2, a spraying device 7 is pulled through a pipe 20 and forms a lining 23 therein, in a generally similar manner to that described above with reference to FIG. 1. Tubing 12 and a cable 9 extend from the spraying device 7 around suitable pulleys (not shown), to above ground level.

However, in FIG. 2, the cable 9 and tubing 12 pass through a train of swab sections 21 and 22, which are entrained by the cable 9 to move with the strain means 7 but somewhat upstream thereof. Each of the swab sections 21 and 22 is of absorbent foam material, to soak up any excess fluid that may be lying in the pipe 20.

Figure 3:
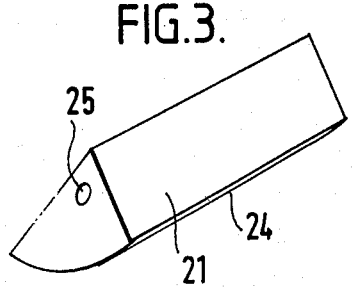
FIGS. 3 and 4 are perspective views of a first swab element of the apparatus illustrated in FIG. 2.
Figure 4:
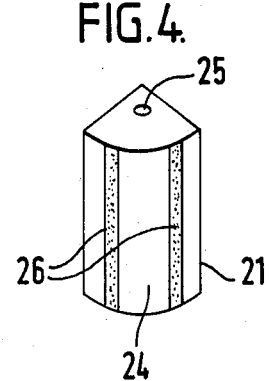
Figure 5:
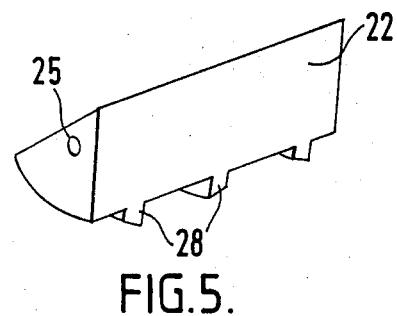
FIGS. 5 and 6 show in perspective and longitudinal section respectively a second swab element of the apparatus of FIG. 2.
Figure 6:
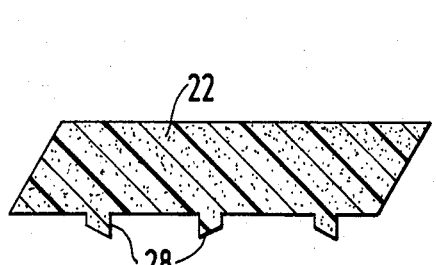

As may be seen in FIGS. 3 and 4, each of the swab sections 21 has a cross-section corresponding to a sector of a circle, which subtends at an angle of approximately 120°. The radius of the lower curved surface 24 of the swab section 21 corresponds substantially to that of the pipe 20. A hole 25 is formed in each section 21, to afford the passage of the cable 9 and tubing 12. Optionally, there is provided a pair of strips 26 of friction resistent material, on the curved undersurface 24 of the swab section 21.

The swab sections 22 have a cross-section which is generally similar to that of the swab sections 21. However, on their undersurface, they are formed with annular ribs 28, which are chamfered.

A typical operation using the apparatus of FIG. 2 will now be described.

Firstly, the pipe 20 to be lined is subject to high pressure water cleaning to remove grease from the pipe wall and debris from within the pipe. Thereafter, there is passed through the pipe 20 a conventional "foam pig", which is a cylindrical body of foam of slightly larger diameter than the pipe 20, which serves to clear standing water and debris from the pipe 20. It will be appreciated that, as the foam pig is being drawn through the pipe 20, it is unlikely to have a smooth unrestricted passage, and will be subjected to jerking or snagging as it is pulled passed obstructions in the pipe.

Thereafter, the spraying means 7 together with the train of swabs sections 21 and 22 is pulled through the pipe 20, but no spraying is carried out. This "dry run" is to ensure that there is now a smooth unrestricted passage through the pipe 20—jerking or snagging may cause imperfections in the finished lining 23.

After this dry run, the spraying means 7 and train of swab sections 21, 22 are drawn again through the pipe 20, but the spraying device 7 is operated to form the lining 23.

It will be appreciated that, as the train of swab sections 21, 22 is being pulled through the pipe 20, they soak up any water lying in the pipe (such as is indicated at 27 in FIG. 2) immediately before the spraying device 7 applies the lining 23. The lying water such as 27 may be due to seepage into the pipe 20, the water collecting at a low point in the pipe. The smoother swab sections 21 assist smooth progress through the pipe, and tend to push water in front of the train of swabs, and to absorb any residue remaining in the pipe. The toothed sections 22 penetrate joints such as 29 in the pipe 20, and the chamfered ribs 28 are able to penetrate joints 29 of varying widths.

A particular advantage of the illustrated arrangement is that the swab sections 21 and 22 are unlikely to be obstructed by any connections into the pipe 20. This is because it is common practice to make any such connections in the upper half of the pipe, and as the cross-section of the swab sections 21, 22 is that of a minor sector, any such obstruction is unlikely to occur. As many sections 21, 22 as required may be used, depending on the amount of water anticipated in the pipe 20 and the absorbent capacity of the swab sections required to accommodate it. Providing a series of swab sections 21, 22 is advantageous in facilitating negotiation of bends in the pipe 20, and entry and exit of the swabs into and out of the pipe 20.

We claim:

1. A method of forming a new pipe within an existing underground pipe, comprising the steps of moving a spraying means through the existing pipe, pumping a curable thixotropic resin to the spraying means, causing the spraying means to spray continuously the thixotropic resin onto the inner walls of the existing pipe to build up in one pass of the spraying means a predetermined self-supporting thickness of the resin which, while uncured, is supported in position by its thrxotropy and adherence to said walls, and allowing the self-supporting resin to cure and harden, said predetermined thickness being such as to provide upon curing of the resin a new self-contained pipe having structural strength, within and independent of the existing pipe such that the formed structure would continue to function in the absence of the existing pipe should the existing pipe decay away altogether.

2. A method according to claim 1, wherein said thickness is in the range 1 mm to 25 mm.

3. A method according to claim 1, wherein said thickness is in the range 2 mm to 15 mm.

4. A method according to claim 1, wherein said thickness is in the range 8 mm to 12 mm.

5. A method according to claim 1, including the preliminary step of warming the thixotropic resin prior to pumping it to the spraying means.

6. A method according to claim 5, wherein the thrixotropic resin is warmed to a temperature in the range 15° C. to 40° C., prior to pumping.

7. A method according to claim 5, wherein the thrixotropic resin is warmed to a temperature in the range 20° C. to 35° C.

8. A method according to claim 1, wherein the thrixotropic resin is pumped to the spraying means by a pump disposed above ground.

9. A method according to claim 1, wherein the spraying means comprises a spinning member, the speed of rotation of which is such as to spray the resin in fine droplets, without causing foaming of the resin on the spinning member.

10. A method according to claim 9, wherein said spinning member comprises a perforated cylinder.

11. A method according to claim 9, wherein said spraying member comprises a cup.

12. A method according to claim 1, wherein said resin is an epoxy resin.

13. A method according to claim 1, wherein said resin is a two-component resin.

14. A method according to claim 13, wherein the two components of the resin are mixed at or adjacent the spraying means.

15. A method according to claim 1, including a preliminary step of swabbing the existing pipe to soak up any fluid lying therein.

16. A method according to claim 15, wherein the existing pipe is swabbed by means of a swab arranged to move through the pipe upstream of the spraying means.

* * * * *